Figure 1:
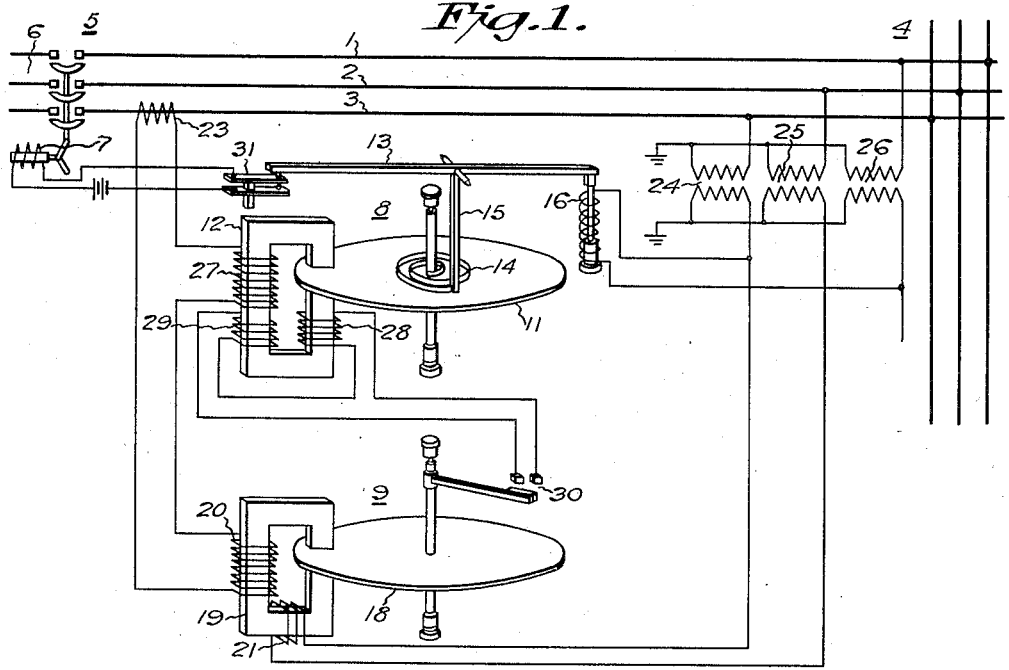

Feb. 10, 1931.    J. V. BREISKY ET AL    1,792,271
RELAY SYSTEM
Original Filed Feb. 14, 1927    2 Sheets-Sheet 1

WITNESSES:
G. S. Neilson
J. E. Foster

INVENTORS
John V. Breisky and
Harold A. McLaughlin
BY
ATTORNEY

Feb. 10, 1931. J. V. BREISKY ET AL 1,792,271
RELAY SYSTEM
Original Filed Feb. 14, 1927 2 Sheets-Sheet 2

WITNESSES:
G. S. Neilson
J. E. Foster

INVENTORS
John V. Breisky and
Harold A. McLaughlin
BY
Chesley S. Carr
ATTORNEY

Patented Feb. 10, 1931

1,792,271

UNITED STATES PATENT OFFICE

JOHN V. BREISKY, OF PITTSBURGH, AND HAROLD A. McLAUGHLIN, OF EDGEWOOD, PENNSYLVANIA, ASSIGNORS TO WESTINGHOUSE ELECTRIC AND MANUFACTURING COMPANY, A CORPORATION OF PENNSYLVANIA

RELAY SYSTEM

Application filed February 14, 1927, Serial No. 167,909. Renewed March 1, 1930.

Our invention relates to protective systems and particularly to relay systems for protecting power circuits for transmitting and distributing energy.

One object of our invention is to provide a protective relay system for sectionalizing a portion of an electrical system which becomes faulty.

Another object of our invention is to provide a relay system for a sub-divided or sectionalized power system whereby circuit interrupting devices properly disposed with respect to the sub-divisions or sections shall be operated to isolate the sub-division or section in which a faulty condition occurs.

A further object of our invention is to provide a relay system that shall automatically vary the time element involved in the control of the circuit interrupting devices according to the distance of the relays from the location of the fault.

An important object of our invention, in addition to those already mentioned, is to provide a relay system employing voltage-restrained elements and directional elements in which such elements shall be so energized that the occurrence of a fault which affects and diminishes the value of the restraining voltage shall not affect the normal operation of the directional element.

In many power systems which are sub-divided or sectionalized by substations and circuit interrupters at such stations, or in ring systems which are energized from one or more sources of energy, it is desirable to provide a system of relays for protecting the power system by isolating a faulty section to permit the remainder of the system to continue in operation. Relay systems employing relays of the voltage-restrained type have been applied to protect such systems and have taken care of many otherwise difficult problems of relay settings because the relays automatically adjusted their time settings to the current and voltage conditions. Such relays embody a current element which operates upon a movable member to close an external tripping circuit, and a voltage element which restrains or tends to prevent the movement of the movable element under normal voltage conditions, but which permits its actuation by the current element when the voltage diminishes to or below predetermined value.

When such relays are disposed to operate the circuit interrupting devices at the ends of the various sections in the power system, the current element is energized in accordance with the current of the circuit and the restraining element in accordance with the voltage of the corresponding circuit. Upon the occurrence of a fault in any section, several of the relays in the system are traversed by the faulty current. Due to the potential gradient, however, which is established between the source of energy and the location of the fault, the restaining elements of those relays which are nearest the fault are least energized and, consequently, the time of operation of such nearest relays is less than that of any other relays connected to the system. Those relays nearest the fault, therefore, operate first to open the circuit interrupters and to isolate the faulty section, before any of the interrupters associated with the other sections are influenced by the associated relays.

Since the relays disposed on each side of a substation would be practically the same distance from a fault occurring in one of the adjoining sections, and would tend to operate in approximately the same time interval, it has been the practice to provide a directional element for one or both voltage-restrained relays to render them selective to operate only when the current which operates the relays traverses the system in a certain direction with respect to the substation. The directional element embodies a current winding and a voltage winding; both of which are energized from the same current and voltage transformers as are used for the voltage-restrained element.

Although the system just described has best solved the many complicated problems which are encountered in protecting transmission systems of different kinds, we have found a disadvantageous condition arising from the energization of both the voltage-restrained element and the directional element by the same voltage. When the system voltage has diminished at any point due to the occurrence of a fault, the voltage-restrained element has operated properly, as intended. Such reduction in voltage, however, has rendered the response of the directional element less sensitive. It is to remedy the latter condition that we propose the present method of energizing the relays, namely, to energize the voltage-restrained element by current and voltage from one phase, but to energize the voltage coil of the directional element by the voltage of another phase. By employing such a system of energization the directional element does not suffer in sensitivity when the main element, that is, the voltage-restrained element, responds to a faulty condition.

The relay which we employ is a modification of that illustrated in an application of Leslie N. Crichton, Serial No. 641,701, filed May 26, 1923, and assigned to the Westinghouse Electric & Manufacturing Company.

Our invention may be better understood upon reference to the accompanying drawings, in which, Fig. 1 is a schematic diagram of a single relay connected to one phase of a three-phase system.

Figure 2:
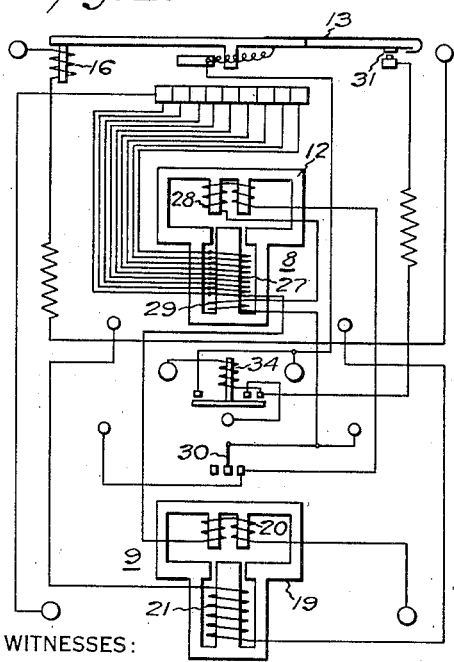
Figure 3:
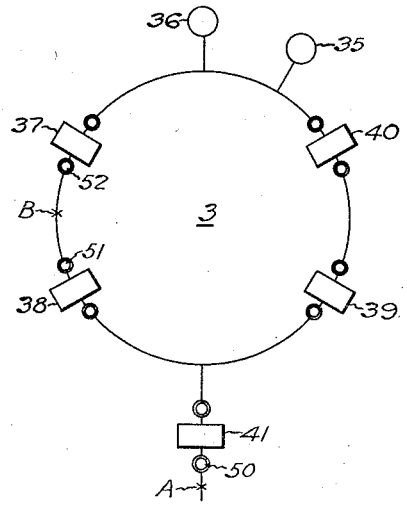
Figure 4:
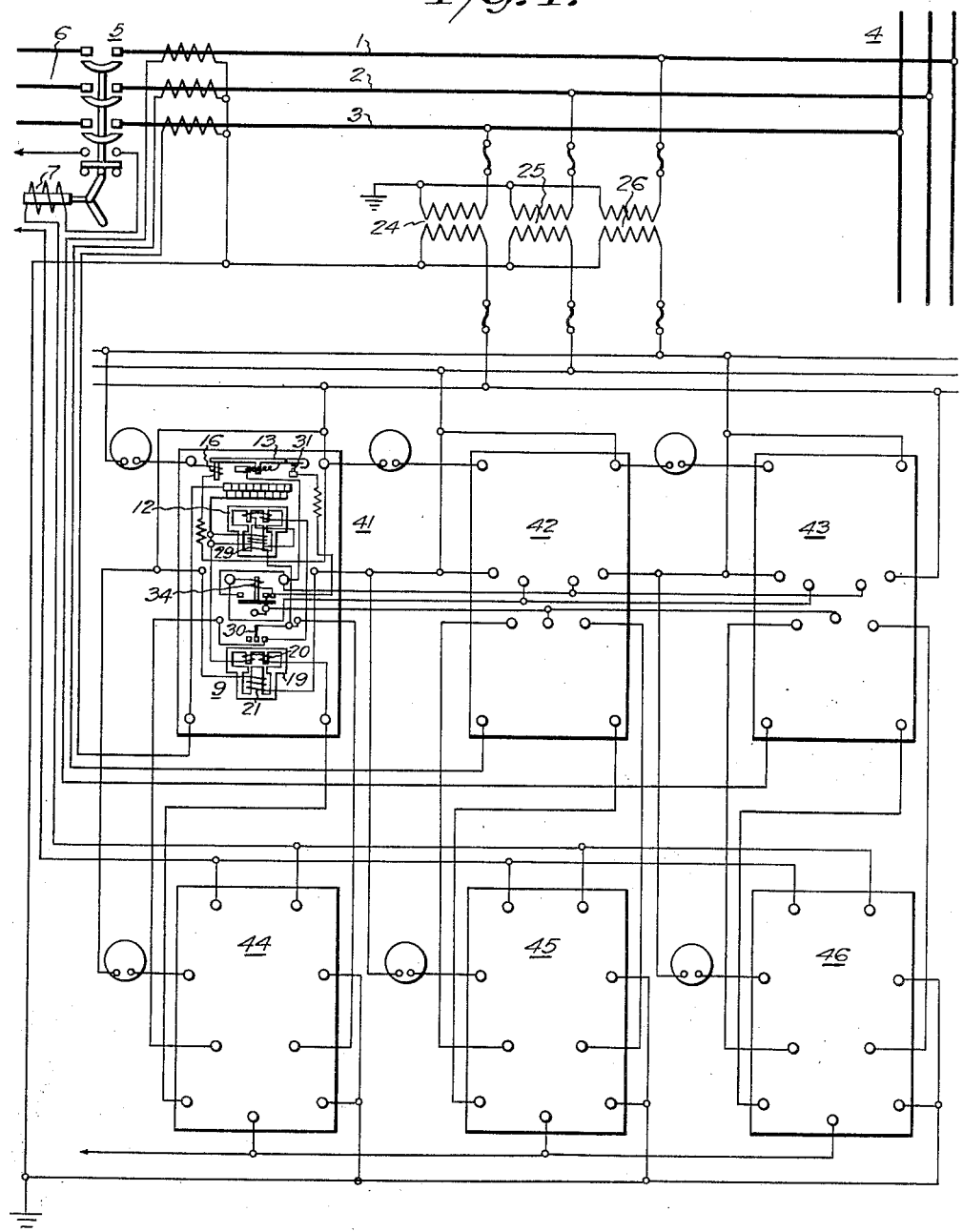

Fig. 2 is a schematic view showing in greater detail the elements of a relay of the type which we employ, Fig. 3 is a diagrammatic view of a ring type transmission system to which the relay system disclosed herein is particularly adaptable, and Fig. 4 is a diagram of a polyphase system showing the complete protection for the circuit.

In Fig. 1 we have illustrated in a simple manner a relay system in which the time of operation is governed by the distance of the relays from a fault. Energy is supplied to the power system through the conductors 1, 2 and 3 from any suitable source of energy (not shown), and such energy may traverse the system in either direction. The section illustrated is shown as being within a substation 4, at which bus bars are located. A circuit interrupter 5 is provided at the substation to isolate the adjoining section 6 upon the occurrence of a fault in it. The interrupter 5 is provided with a trip coil 7 which is energized at the proper time upon the occurrence of a fault by a relay unit comprising a voltage-restrained current element 8 and a co-operating directional element 9.

The current actuated voltage-restrained element 8 is schematically illustrated as comprising a movable disc 11 which is inductively actuated by an electromagnet 12 to operate a lever 13 through a spring 14 and an arm 15. The action of the current element through the spring and arm is restrained or counter-balanced under normal conditions by a solenoid or voltage element 16.

The directional element comprises an induction disc 18 which is influenced by an electromagnet 19 provided with a current winding 20 and a voltage winding 21.

The current elements are energized from the circuit by means of a current transformer 23 and the voltage elements are energized through potential transformers 24, 25 and 26. The current transformer 23 is connected to the current winding 20 of the directional element and to a current winding 27 of the main or current-actuating element. In order to provide a flux that will co-operate with that set up with the current winding 27 to actuate the disc 11, an auxiliary winding 28 is provided which is energized from a winding 29 that is influenced by a transformer action from the main winding 27. The circuit including the windings 28 and 29 is controlled, however, by a switch 30 which is closed by the directional element 9 only when the fault energy traverses the system in a predetermined direction for which the relay is adjusted. Thus, if we assume that the relay has been disposed to operate the interrupter only upon the occurrence of a fault on the left-hand side of the interrupter, or, as it may be described, to operate only upon a condition of energy flowing from the bus, the switch 30 will be closed instantaneously. Under other conditions, the switch 30 will be maintained open and the disc will be prevented from operating in a reverse direction by a suitable back stop.

Upon the occurrence of a fault causing energy to flow from the bus towards the section 6, the switch 30 will close immediately and connect the windings 28 and 29 for proper operation. The current element will thereupon begin to operate to close its contact members 31 to trip the interrupter 5. If it be assumed that the fault is in the section 6, and involves the phase conductor 3, the relay elements 8 and 9, being nearer to the fault than other relays, except those at the other end of the section 6, will operate first. The reason therefore becomes apparent from a consideration of the fact that a potential gradient is established between the source of energy and the fault. The voltage which influences the restraining coil 16 of the element 8 is less than the restraining voltage on any other relay except that at the other end of the section 6, and, consequently, the contacts 31 will be closed quicker than the corresponding contacts of any other relay arrangement in the system. A faulty condition involving other phases of the system would, therefore, influence the relays provided for those phases in a similar manner.

For the sake of simplicity we have illustrated the connections of the relays for only one phase. Similar relays are provided for the other phases, being connected as shown in Fig. 4.

If the same voltage which is applied to the restraining coil 16 is employed to energize the directional element 9, the latter will become less sensitive upon the occurrence of a faulty condition causing an excessive drop in voltage. For that reason we propose to energize the directional element by a voltage derived from another phase, so that it will not be influenced by a fault which would modify the normal energization of the voltage element 16. Since the other phases will be similarly protected, a fault which will affect the voltage supplied to the directional element will cause the operation of the relay connected to another phase of the circuit and will trip the interrupter 5 in just the same manner.

Fig. 2 is a schematic diagram illustrating more in detail the arrangement of the single relay unit comprising the main current actuating voltage-restrained element 8 and the directional element 9. Suitable terminals are provided to permit the relay windings to be tested whenever desired. For the sake of simplicity, the induction disc elements have been omitted since it is well-known to those skilled in the art just how an outer segment of the disc is disposed in the air gap between the upper and the lower pole elements of the electromagnets.

The current winding 27 of the current-actuated element 8 is provided with several taps to permit the relay to be adjusted for different operating values. A small high speed solenoid switch 34 is employed to conduct the tripping current and to remove such burden and the possible arcing from the delicate contact members of the current-actuating element.

Fig. 3 illustrates schematically a ring system which is energized from one or more sources of energy 35 and 36 and is divided into several sections by substations 37, 38, 39 and 40. Circuit interrupters are shown on each side of each substation to permit the isolation of a faulty section between them. An additional substation 41 is shown connected to the section between the stations 38 and 39. The small circles on each side of the substations represent the complete relay systems such as illustrated in Fig. 4.

If a fault should occur at the point A beyond the substation 41, the relays 50 being closest to the location of the fault, would operate in less time than any of the relays associated with the other circuit interrupting devices and would operate to disconnect the faulty section from the substation 41 before any of the relays at the other stations operated to effect the opening of the associated interrupters. For this application, since energy can flow in only one direction, the current actuating voltage-restrained element alone is sufficient. The lower or directional element is not necessary for this application. For portions of the circuit within the ring, however, it is necessary to provide the directional element also in order that the relay may take into consideration, not only the distance of the relay from the fault, but also the direction in which energy is flowing toward the fault. If, for example, a portion of the system between the substations 37 and 38 become faulty, as at the point B, energy will flow to the fault through the substation 37 and also around the right-hand portion of the ring system through the substations 40, 39 and 38. Since each substation is provided with two circuit interrupters, it is necessary that some selective means, such as the directional element, be provided to control the operation of the proper circuit interrupters in accordance with the direction of energy flow to the fault.

Upon the occurrence of the fault in the section between the stations 37, 38, the voltage-restrained elements of the relays associated with the interrupters on both sides of the stations 37 and 38 would operate normally to close their contact members at the same time, after an interval, depending upon the distance of the stations from the fault, if the directional elements were not provided. The relay systems 51 and 52 are so connected, however, that the directional elements of relays 51 and 52 will immediately close their contact members, upon the occurrence of the fault at B. The current-actuating elements will thereupon operate to trip the associated interrupters after an interval of time, depending upon the distance of the relay units 51 and 52 from the fault B.

Although the voltage-restrained relays associated with the interrupters at the substations 39 and 40 may be energized to operate because of the faulty current, the time interval of operation at those stations will be in excess of the time interval of the relays 51 at the station 38 because of the greater restraining voltage at the stations 39 and 40. Consequently, the relays 51 and 52 will operate the associated interrupters and disconnect the faulty section from the system, leaving the other stations connected to receive energy from the sources 35 and 36.

Since the operation of the current-actuated voltage-restrained element depends upon a diminution in the value of the normal operation voltage, whereas the directional element must retain its sensitivity so that it may immediately select the direction in which the current is flowing, it is necessary to energize the directional element by a voltage other than that supplied to the restraining element in order that the sensitivity of the directional element may not be impaired upon the occurrence of a faulty condition.

Fig. 4 illustrates a complete system of protection for actuating an interrupter to isolate a faulty section. The relay system is provided with three relay units 41, 42 and 43, each of which corresponds to a complete relay unit such as is illustrated in Fig. 2. For suitable ground protection relay units 44, 45 and 46 are provided which correspond to the current-actuated voltage-restrained elements only, without the directional elements provided for the complete relay that is shown in Fig. 2.

By energizing the voltage winding of the directional element by a voltage derived from a phase other than that from which the current is derived which energizes the main and the directional elements, the sensitivity of the directional element is not impaired when the phase from which the main element derives its voltage becomes faulty. The advantages accruing from the use of a relay system of the voltage-restrained type are thereby retained without the disadvantages heretofore suffered, due to the loss of sensitivity of the directional element upon the occurrence of a faulty condition.

Our invention is not limited to the connection of the relays specifically as illustrated, or to the construction of the relays as shown, since modifications may be made therein without departing from the spirit and scope of the invention, as set forth in the appended claims.

We claim as our invention:

1. A protective system for a polyphase transmission circuit having a circuit interrupter therein for disconnecting a faulty section thereof, interrupter control means including a relay having current-actuating and voltage-restraining windings, and means for controlling the effectiveness of said relay including a directional relay having a current and a voltage winding, the current windings of said two relays being connected for energization in accordance with the current traversing one of the phase conductors of said circuit, one of the voltage windings being connected to said circuit for energization in accordance with the voltage on said phase conductor and the other voltage winding being connected for energization in accordance with the voltage on a different phase conductor.

2. A protective system for a polyphase circuit comprising impedance relays associated with each phase of said circuit, each of said relays having a current and a voltage winding connected for energization from one of said phases, and means for controlling the operation of said relays comprising a directional relay associated with each of said impedance relays having the current winding thereof connected respectively for energization from the same phase as the current winding of the associated impedance relay and the voltage winding thereof connected for energization from a different phase than the voltage winding of the associated impedance relay.

3. In a sectionalized alternating-current circuit, circuit interrupters therein for selectively disconnecting faulty sections thereof, means for actuating each interrupter including a relay having a movable armature and contacts operated thereby for controlling the operation of said interrupter, means for actuating said armature in accordance with the impedance of said circuit between the associated interrupter and a fault, and means energized from said circuit for preventing actuation of said armature when the flow of power in said circuit is in a predetermined direction.

4. In a sectionalized alternating-current circuit having circuit interrupters therein for selectively disconnecting faulty sections thereof, control means for each interrupter including a current-actuated voltage-restrained relay element for measuring the impedance of the circuit between the associated interrupter and a fault on the circuit, and means associated with said element and energized from said circuit for preventing effective energization of said element when the power flowing in said circuit is in a predetermined direction.

In testimony whereof, we have hereunto subscribed our names this 8th day of February, 1927.

JOHN V. BREISKY.
HAROLD A. McLAUGHLIN.